UNITED STATES PATENT OFFICE.

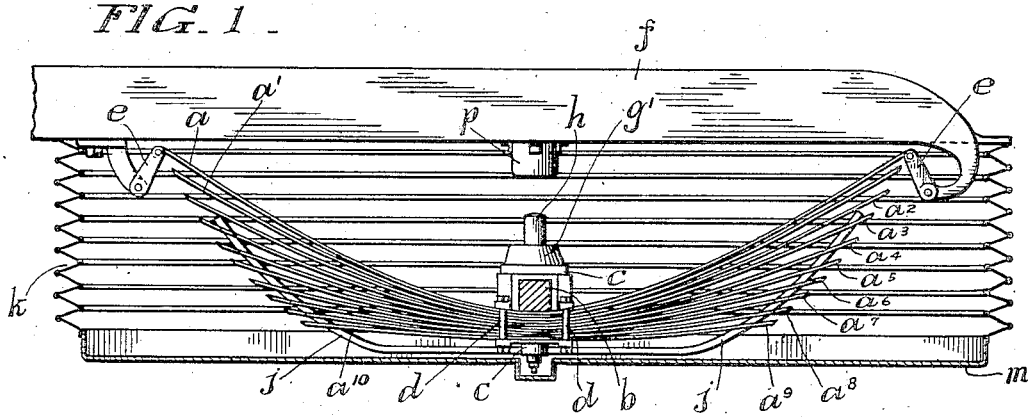
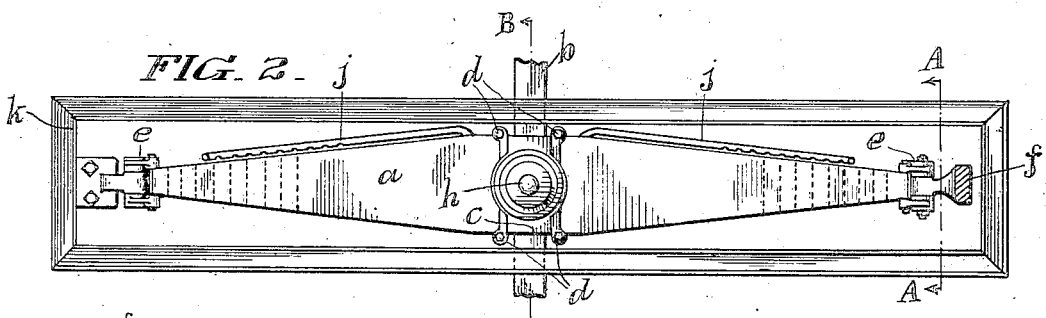
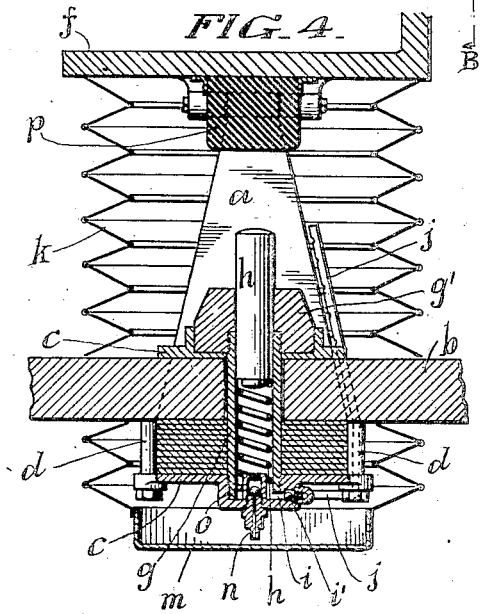
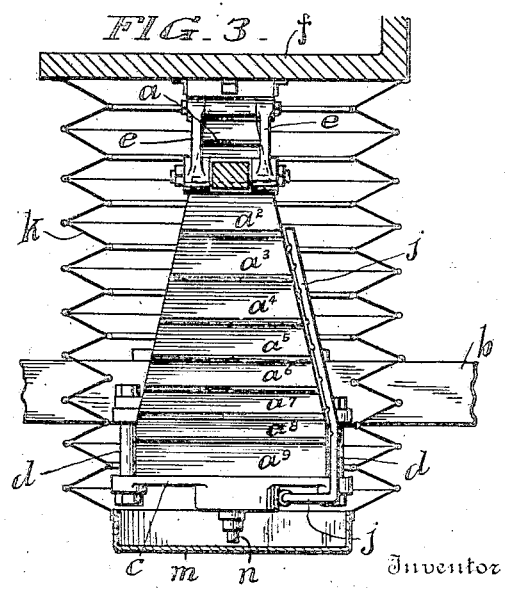

BENTLEY L. RINEHART, OF PHILADELPHIA, PENNSYLVANIA.

VEHICLE-SPRING.

1,094,814.   Specification of Letters Patent.   Patented Apr. 28, 1914.

Application filed March 13, 1913. Serial No. 753,931.

*To all whom it may concern:*

Be it known that I, BENTLEY L. RINE-HART, a citizen of the United States, and resident of the city and county of Philadelphia, State of Pennsylvania, have invented an Improvement in Vehicle-Springs, of which the following is a specification.

More particularly my invention relates to springs which are fastened at the middle to the axle of the vehicle and at the ends to the movable body by links or hinges. Such springs have heretofore been laminated with the leaves rigidly secured together. In such springs all of the leaves are in action at all times irrespective of the load. The result is that a spring of this character having proper resilience for a full or heavy load is stiff and non-resilient with a light load.

It is the object of my invention to make the resilience of the spring adapt itself automatically to the load, having a maximum resilience for the lightest load and decreasing in resilience as the load increases even, if desired, to such an extent that under abnormal conditions it will act as a shock absorber. To accomplish this result I form the spring of leaves of decreasing length and curvature connected together at the middle but with their outer ends free, so that only those leaves are brought into action which are necessary to sustain the load. This also makes it possible to add any number of additional leaves which are never in action under normal conditions, but act as shock absorbers when the vehicle passes over unusual bumps or depressions.

My invention also includes means for automatically lubricating the leaves of the spring to keep them free and in operative condition, and means for protecting them from external contamination by mud and dust.

In the drawings: Figure 1 is a front elevation of the spring with the inclosing casing and supporting axle shown in section; Fig. 2 is a plan view of the same; Fig. 3 is a vertical cross section on the line A—A of Fig. 2 on an enlarged scale; and Fig. 4 is a similar view on the line B—B of Fig. 2.

The spring is composed of a series of leaves $a$, $a'$, $a^2$, $a^3$, &c., fastened together at the center, but otherwise free. Each leaf is a complete spring in itself, and is preferably made of sheet steel of uniform thickness wide at the middle and tapering toward the ends. The narrowing of the leaves from the center toward the ends makes each leaf a perfect spring throughout, the width at any point being proportional to the length and leverage from the center. There is consequently a perfect spring action at all points, which would not be the case if the leaves were of uniform width or weight of metal throughout their length. The leaves are curved upward, the radius of curvature and the length increasing from the base. Thus the ends of the leaves on both sides beyond the central connection are entirely free from one another, the intervening spaces between adjacent leaves increasing with the radius. The spring thus formed is fastened at the middle to the axle $b$, in any suitable manner, as by clips $c$ and bolts $d$. The topmost leaf $a$ is attached at its ends, as by the links $e$, to the frame $f$ of the upper body of the vehicle.

Extending through the middle of the spring formed by the series of leaves and through the axle is a cylinder $g$ supported at the bottom by the clip $c$, and extending at the top into an elastic bumper $g'$. Within this cylinder is a plunger $h$ held by a spring $h'$ in the cylinder in a raised position with its upper end protruding through the bumper $g'$.

At the base of the cylinder $g$ is an outlet $i$, controlled by a check-valve $i'$ leading to a tube $j$ having branches extending up adjacent to the ends of the leaves $a$, $a'$ &c. of the spring. These branches are provided with orifices through which oil may be squirted between the leaves of the spring in the manner described hereinafter.

The spring is inclosed in a collapsible cover $k$, which may be made of canvas or other fabric treated to make it oil and water proof. On the bottom of the cover is a pan $m$ which acts as an oil reservoir.

In the bottom of the clip $c$ is an inlet $n$ from the pan $m$ controlled by a check-valve $o$.

On the frame $f$ of the upper body of the vehicle is a bumper $p$ arranged above and adapted to make contact with the axle bumper $g'$ and the plunger $h$. The cylinder $g$ and pan $m$ contain sufficient oil for lubricating the leaves of the spring.

The load on the body of the vehicle depressing the frame $f$ acts first on the upper leaf $a$, which is in itself a complete spring capable of sustaining a proportionate weight. As the load increases beyond the power of the upper leaf $a$ to sustain it, that leaf is forced into contact with the second leaf $a'$ and the two leaves $a$ and $a'$ then act together as a spring to sustain the load, and as the load increases additional leaves are similarly brought into action and the spring power is increased relatively to the load. At no time however are more leaves or spring members in action than the load actually requires. A great advantage of this construction is that more leaves or springs may be used than the normal maximum load requires. These extra leaves do not decrease the resiliency of the spring under normal conditions, but are present to come into action as shock absorbers under abnormal conditions, as when the vehicle strikes a bump or depression in the road.

When the spring is flattened to such an extent that the upper bumper $p$ strikes the plunger $h$, the latter will be pushed down against the action of the spring $h'$, and oil will be forced through the outlet $i$ and valve $i'$ into the pipes $j$ and between the leaves of the spring as they separate after the shock. When the plunger rises under the action of the spring $h'$ it will suck in oil from the pan $m$ through the inlet $n$ and check valve $o$, thus refilling the cylinder $g$. The oil that is squirted upon the leaves of the spring by the action of the plunger $h$ flows back by gravity into the pan $m$.

The cover $k$ prevents the spring from becoming fouled with mud and dust and enables the lubrication to be effected.

What I claim is as follows:

1. A vehicle spring consisting of a plurality of flat leaves of decreasing length and curvature each narrowing in width from the middle toward the ends, said leaves being secured together at the middle but being free and separating from one another from the point of connection at the middle toward the ends so as to form intervening spaces between the flat faces of adjacent leaves, said faces of adjacent leaves being brought into contact when the spring is compressed.

2. A vehicle spring consisting of a plurality of flat leaves of decreasing length and curvature each narrowing in width from the middle toward the ends and the width at any point being proportional to the length and leverage from the middle, said leaves being secured together at the middle but being free and separating from one another from the point of connection at the middle toward the ends so as to form intervening spaces between the flat faces of adjacent leaves, said faces of adjacent leaves being brought into contact when the spring is compressed.

3. The combination with the body of a vehicle and its wheel-axle, of a spring consisting of a plurality of leaves of decreasing length and curvature secured together at the middle to the axle and having their ends free and separated from one another so as to form intervening spaces between adjacent leaves with the ends of the upper leaf connected with the body of the vehicle, and means to introduce a lubricant in the intervening spaces between said leaves actuated by the body of the vehicle.

4. The combination with the body of a vehicle and its wheel-axle, of a spring consisting of a plurality of leaves of decreasing length and curvature secured together at the middle to the axle and having their ends free and separated from one another so as to form intervening spaces between adjacent leaves with the ends of the upper leaf connected with the body of the vehicle, an oil pump within the middle of said spring and axle actuated by the contact of the body of the vehicle for introducing oil to the intervening spaces between the leaves of the spring.

5. The combination with the body of a vehicle and its wheel-axle, of a spring consisting of a plurality of leaves of decreasing length and curvature secured together at the middle to the axle and having their ends free and separated from one another so as to form intervening spaces between adjacent leaves with the ends of the upper leaf connected with the body of the vehicle, a cylinder extending through said axle and the middle of the spring adapted to contain oil, and a plunger in said cylinder actuated by the contact of the vehicle body to eject oil upon the leaves of the spring.

6. The combination with the body of a vehicle and its wheel-axle, of a spring consisting of a plurality of leaves of decreasing length and curvature secured together at the middle to the axle and having their ends free and separated from one another so as to form intervening spaces between adjacent leaves with the ends of the upper leaf connected with the body of the vehicle, a cylinder extending through said axle and the middle of the spring adapted to contain oil and having spray tubes extending to the leaves of the spring, and a plunger in said cylinder actuated by the contact of the vehicle body to eject oil upon the leaves of the spring.

7. The combination with the body of a vehicle and its wheel-axle, of a spring consisting of a plurality of leaves of decreasing length and curvature secured together at the middle to the axle and having their ends free and separated from one another so as to form intervening spaces between adjacent leaves with the ends of the upper leaf connected with the body of the vehicle, a cylinder extending through said axle and the middle of the spring adapted to contain oil, and a plunger in said cylinder actuated by the contact of the vehicle body to eject oil upon the leaves of the spring through said tubes, and a cover inclosing said spring.

8. The combination with the body of a vehicle and its wheel-axle, of a spring consisting of a plurality of leaves of decreasing length and curvature secured together at the middle to the axle and having their ends free and separated from one another so as to form intervening spaces between adjacent leaves with the ends of the upper leaf connected with the body of the vehicle, a cylinder extending through said axle and the middle of the spring adapted to contain oil, and a plunger in said cylinder actuated by the contact of the vehicle body to eject oil upon the leaves of the spring through said tubes, and a cover inclosing said spring having a pan at the bottom adapted to receive the oil flowing back from the leaves of the spring.

9. The combination with the body of a vehicle and its wheel-axle, of a semi-elliptical spring consisting of a plurality of leaves of decreasing curvature secured together at the middle to the axle and having their ends separated from one another to form intervening spaces between adjacent leaves with the ends of the upper leaf connected to the body of the vehicle, and means to introduce a lubricant in the intervening spaces between said leaves, said means being actuated by the body of the vehicle.

In testimony of which invention, I hereunto set my hand.

BENTLEY L. RINEHART.

Witnesses:
R. M. KELLY,
E. W. SMITH.